May 7, 1929. E. A. PRUDHOMME 1,711,855
MANUFACTURE OF CARBURETING LIQUIDS SIMILAR TO PETROL
Filed Jan. 20, 1925
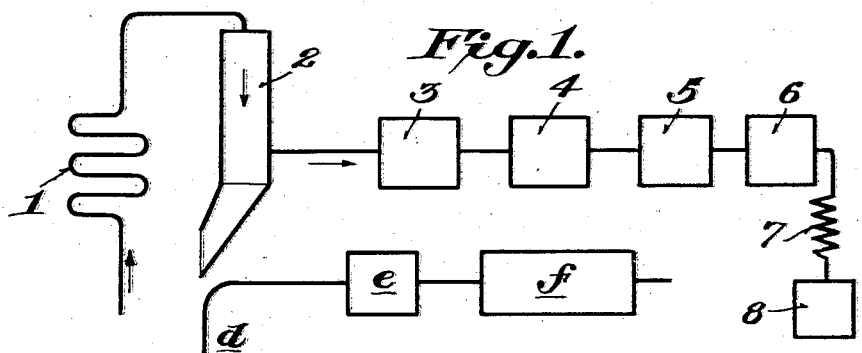
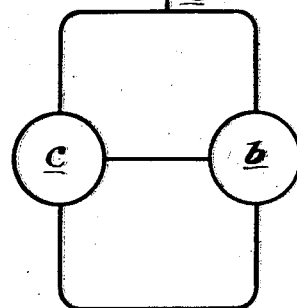
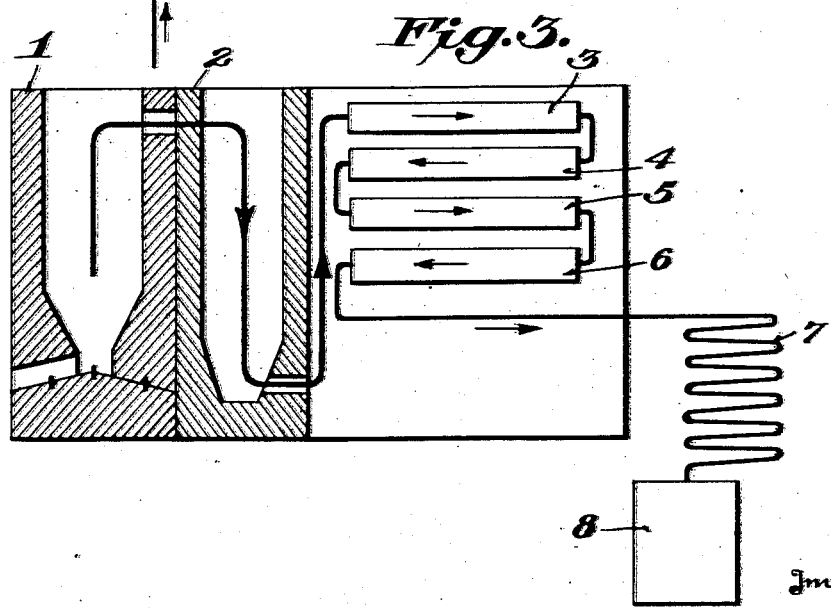

Patented May 7, 1929.

1,711,855

UNITED STATES PATENT OFFICE.

EUGÈNE ALBERT PRUDHOMME, OF NEUILLY-SUR-SEINE, FRANCE, ASSIGNOR TO SOCIÉTÉ INTERNATIONALE DES PROCEDES PRUDHOMME (S. I. P. P.), OF PARIS, FRANCE, A JOINT-STOCK COMPANY.

MANUFACTURE OF CARBURETING LIQUIDS SIMILAR TO PETROL.

Application filed January 20, 1925, Serial No. 3,655, and in France May 19, 1924.

The present invention relates to a process of manufacturing saturated synthetic carburants, using solid fuel, or hydrocarbon fuel, of inferior grade as the starting materials, and converting the same into stable liquid fuel enriched in hydrogen.

The process comprises, in known manner, distillation at low temperature of the starting materials (lignites, peats or other materials) in a suitable apparatus (gas producer, retort, distillation furnace and the like) wherein the said materials, suitably heated, are traversed by a current of hot gas or of vapors (water gas, steam, residual gases of coking or of the manufacture of industrial liquid fuels), the gas being subjected to a catalytic operation after it leaves the producing apparatus and after previous purification.

The invention concerns certain improvements in these known processes, whereby as a result of better utilization of the materials treated as well as of the calories developed in the course of their conversion into light products, a more economical and more rapid manufacture is made possible; these improvements assure, in brief, an incomparably higher yield than is possible with existing processes.

These improvements consist, in principle, of means which permit of introducing into the catalytic apparatus wherein the first industrial stage of transformation finally terminates, a gaseous mass as rich as possible in carbon, in hydrogen and in calories.

To this end, the gases leaving the producer apparatus (gas producer; retort, distillation furnace, and the like) are integrally conducted to the catalysts; they reach there having retained at least all the useful heavy hydrocarbons, this result being obtained by maintaining in the entire apparatus, including the communicating conduits, a temperature preventing any condensation from taking place and consequently preventing the separation of the heavy hydrocarbons.

The integral mass of gases leaving the generator apparatus comprises, in effect, the whole of the products, as the olefines, which condense at temperatures of about 100 to 150° C. and products such as tar vapors, which condense only at very much higher temperatures, in accordance with the invention, this integral mass is conducted to the apparatus in which it is subjected to catalytic treatment, and it has not given off its content of heavy hydrocarbon, either as the result of an intentional condensing action or of any strong cooling action in the course of its travel. This means, the intentional retention of the heavy hydrocarbons in the state of vapors in the gaseous mass to be treated, rendered possible by maintaining an appropriate temperature, is far from having for its purpose and for its exclusive result prevention of fouling of the catalysts due to condensation of tars, which would militate rather in favor of the elimination of the tars by condensing the same as completely as possible before the entrance of the gas into the catalyzing apparatus. The means referred to have, above all, for their object and result the retention of the vapors of the useful tars in the mass to be treated, for the purpose of causing them to enter into reaction in the catalysts which, as I have found, eminently conduces to the enrichment in hydrogen of the industrial product which issues from the catalyzing apparatus.

To state the matter differently, that which was heretofore considered an obstacle in the manufacture of light synthetic hydrocarbons has been recognized by me as an advantage in such manufacture.

Another essential feature of the invention, complemental and indispensable to that just referred to, is the construction of the catalyzer apparatus in such manner that advantage may be taken of the presence, in the mass to be treated, of the vapors of the heavy hydrocarbons intentionally conducted to the apparatus.

To this end the catalyzer apparatus is divided into a plurality of elements joined together in a series and the elements themselves as well as the communicating conduits therebetween are maintained at a suitable temperature to prevent condensation, this division of the catalyzer apparatus permitting vapors of the heavier fractions to act according to their nature, as well as those which condense at from 150 to 200° C. Thus in a first catalyzer of the series I produce a general hydrogenation, a deoxidation of the bodies easily hydrogenated in the condition in which they issue from the purifiers arranged between the generating apparatus and the catalyzers; the carbon monoxide (CO) of the non-condensible products gives rise, as is known, to the production of methane ($CH_4$); but, at the same time, the condensible bodies such as the phenols ($C_6H_5OH$) lose their oxygen and pass into the state of benzines ($C_6H_6$).

In this first preparatory catalysis the definitive enrichment cannot be immediately effected, and for this reason the entire quantity of gas is conducted (all condensation always being prevented in the course of travel) to a second catalyzer element, where it is prepared for the definitive enrichment, by a preliminary subdivision, or differently stated by a breaking of the chain, with relation to such bodies as methane ($CH_4$) which are to be saturated as well as the saturated bodies of the same series (decane, ondecane, dodecane, etc.) present in the vapors of the entrained tar vapors. This subdivision will permit, in a third element of the catalyzer series, a new hydrogenation by the hydrogen evolved in the second element. In the third element there is thus finally produced, simultaneously with polymerization which is facilitated by the fact that the hydrogen is in a nascent state, the saturation with hydrogen of all the condensible or noncondensible bodies which, in view of this final saturation, were fragmented in the second catalyzer apparatus. The fact that hydrogen in the nascent state was prepared in the second catalyzer apparatus thus facilitates the hydrogenation of the condensible bodies such as phenols. It will thus be noted that the passage, up to within the catalyzers, of the condensible elements present in the tar vapors is closely connected to the process of catalysis in a step by step action, the combination of these two means being one of the important characteristics of the invention.

If care be taken to maintain a suitable temperature to prevent condensation, during the purification of the integral body of gas, during its passage from the generator apparatus, as well as during the entire travel of the integral mass of gas from the evaporator to and through the catalyzer apparatuses, it will be clearly understood that this temperature progressively descends as the issue of the gases and vapors from the third catalyzer is approached, this being so not only because the mechanical entraining of the condensible products in part prevents their condensation, but principally because these products become progressively lighter.

For this reason it is necessary to maintain in the purifiers and the conduits extending to the catalyzer apparatuses a temperature somewhat less than the temperature of condensation of the heavy fractions and in the catalyzers a temperature not exceeding approximately 250° C.

If, in a manner known to the art, instead of treating only the gases of distillation or of gasification of fuel or of carbonaceous starting material, these industrial materials are treated by causing them to be traversed by a current of hot gases or of vapors, using for this purpose residual coking gases or gases evolved in the industrial production of fuels, either exclusively or otherwise, the maintenance of the calories and of the useful elements in the mass subjected to catalysis is completed, in accordance with the invention, by the fact that the current of hot additional gases (residual gases only, or added gas such for example as water gas) is conducted, prior to its passage through the fresh materials under treatment, through a body of hot coke resulting from a previous operation.

To state the action more definitely, the generator apparatus is divided, into two elements which are traversed in series by the hot aditional gases; one of these elements, the admission or entrance element, being the one which has been drained, in large part, by a preceding operation and thus containing primarily hot coke, while the second element of the series is that which is to receive the new charge to be treated, which is then in course of distillation, these two elements alternatively acting in one capacity and the other.

In this manner a reheating of the additional gases (residual and others) is obtained, and consequently a recovery of the calories contained in the coke, at the same time that the carbon content of the additional gases is increased; particularly the carbonic acid gas contained in the hot gases passes into the state of carbon monoxide, a gas which is well suited to promote the operation of enrichment in hydrogen which occurs in the catalytic apparatus.

From what has been said above it will be understood that, in accordance with the invention, by following the cycle of operation for converting any given starting materials into synthetic liquid fuel the maximum yield is obtained, inasmuch as with a minimum expenditure of calories a maximum of light synthetic fuel is produced.

For the practical application of the improved process described above, an installation similar to that shown in the accompanying drawing may be used, wherein Fig. 1 shows schematically one form of installation for practicing the process, Fig. 2 is a schematic view of another installation for practicing the process, and Fig. 3 is a vertical section of a particular arrangement of apparatus such as shown in Figs. 1 and 2.

1 is a heating coil into which is introduced the distillation gas which contains, for example, hydrogen and methane in substantial proportions, carbon monoxide, azote and hydrocarbons of the $C_nH_n$ type in very small proportions.

The heated gas traverses downwardly, the retorts 2 containing a fuel, for example lignites. In these retorts, the gas causes distillation at low temperature of the lignites. The gases evolved by this distillation contain carbon monoxide, hydrogen, and for example 15 to 20% of unsaturated gaseous hydrocarbons. I thus obtain a complex gaseous mixture containing a substantial proportion of acetylenic hydrocarbons $C_nH_{2n-2}$ and, in unstable equilibrium, a certain number of those hydrocarbons tending to condense to form tar. The temperature in the retort 2 and in the adjacent passages is maintained at a degree sufficient to completely prevent such condensation.

The integral gaseous mixture, i. e., the gaseous mixture which contains at the same time the permanent gases and the readily condensible vapors, passes into a purifying apparatus 3 containing a purifying mixture such as the Laming mixture, which is a mixture of lime and oxide of iron rendered porous by sawdust and heated to a suitable temperature. This mixture frees the gaseous current of the major part of the sulphur which it contains and which results, particularly, from the distillation of lignites. The temperature to which the purification apparatus is heated prevents all condensation of the heavy hydrocarbons of the gaseous mixture. The material which thus issues from the purifying apparatus 3 is a gaseous mixture freed of the major part of its noxious ingredients, of its sulphur particularly, and charged with acetylenic hydrocarbons, the effect of which is to facilitate the step by step or stage operation of catalysis, hereinafter described, and to facilitate and regulate the conversion of the gaseous mixture into liquid carburant.

The gaseous mixture issuing from the purifying apparatus next passes into 4 over a first catalyzer tube of pumice stone impregnated with nickel powder and heated to between 180° and 200° C. I thus cause the formation of a substantial quantity of methane in the gaseous mixture, while the phenols pass over into the state of benzines. In other words, as stated above, a general hydrogenation is effected in the first catalyzer apparatus.

The mixture thus charged with methane and containing nevertheless a certain proportion of acetylenic hydrocarbons passes into 5 over pumice stone provided with vanadium and nickel, heated to a temperature varying between 200° and 250° C; the methane is dehydrated with a formation of acetylene and hydrogen. As a matter of fact, and as above explained, a breaking up or dividing is effected, as to the bodies such as methane which are to be saturated as well as to the bodies of the same series (decane, ondecane, dodecane, etc.) and which have been brought to the state of saturation, by reason of the conservation or retention of the tar vapors.

Finally, the gaseous mixture, which has become very rich in acetylenic carbons passes into 6 over pumice charged with nickel and cobalt and heated to about 180° C., thereby causing polymerization of the acetylenic hydrocarbons simultaneously with the saturation with hydrogen of all the bodies which had been fragmented in the second catalyzer apparatus. There is thus finally obtained at the outlet of the catalyst tube 6 a polymerized acetylenic mixture of hydrocarbons which may be easily condensed in a cooled coil 7 and collected in the receptacle 8.

The residual gases not condensed in the receptacle 8 may be either returned to the coil 1 if they are sufficiently rich in hydrocarbons, or used to heat the apparatus.

These liquid products present variable compositions which render them more or less analogous to American gasoline, Caucasian gasoline or Galician gasoline, of which they have substantially the composition, the odor, the appearance and the density.

In the operation of the above described process the temperatures of all the passages, of the mixture purifier 3 etc., are as above stated, maintained at such values that no condensation of the oils or the tars occurs. Consequently, these tars cooperate with a part of the uncondensible gases contained in the hot gases of distillation or of gasification to form uncondensible gases and liquid carburants.

As shown schematically in Fig. 2, the installation may comprise a divided generator apparatus, for example two distillation retorts $b$ and $c$, so related as to constitute alternatively a generator apparatus proper and a coking column serving to reheat additional gases which take additional calories and carbon from the coke.

By feeding the additional gases through the conduit $a$, and assuming then that the retort $b$ is charged with hot coke resulting from the partial exhaustion of the starting materials which are to be treated, these gases passing from $a$ to $b$ and thence into $c$ then charged with fresh materials, the integral body of gases from $c$ to $d$, thence through a purifier $e$ into the catalyzer apparatus $f$ constructed as above described.

When the mass $c$ has been converted into coke by distillation and the retort $b$ emptied of its contents, the retort is charged with fresh materials. The additional gases are then first conducted from *a* to *c*, and thereafter through *b*, *d* and *f*.

Practically to reduce to the minimum the losses of calories and to assure the application of the process of catalysis in stages of the integral mass of purified gas having retained the useful heavy hydrocarbons, it is desirable to arrange in heavy masonry the retorts or distillation furnaces 1, and 2, the purifying apparatus 3 and the catalysis apparatus in stages 4, 5 and 6 (Fig. 3).

I claim:

1. A process for manufacturing liquid fuels which consists in subjecting hydrocarbon vapors to a staged catalysis in a series of catalyzers which effect in successive catalyzers a general hydrogenation of said products, a dehydrogenation or a splitting up of said products into unsaturated hydrocarbons, and a saturation and polymerization of said products.

2. A process for manufacturing liquid fuels which consists in subjecting hydrocarbon vapors to a staged catalysis in a series of catalyzers which effect in successive catalyzers a general hydrogenation of such products, a splitting up of said hydrogenated products into unsaturated bodies with liberation of hydrogen, and a saturation and polymerization of said unsaturated bodies.

3. A process for manufacturing liquid fuels which consists in subjecting hydrocarbon vapors to a staged catalysis in a series of catalyzers, effecting in successive catalyzers a general hydrogenation, a splitting up of the hydrogenated products into unsaturated hydrocarbons, and a saturation and polymerization of said unsaturated hydrocarbons, the temperature being maintained sufficiently high to avoid condensation of the heavy fractions.

4. A process for manufacturing liquid fuels which consists in vaporizing hydrocarbons and subjecting the products of evaporation to a successive catalysis effecting in successive steps first a general hydrogenation, then a splitting up into unsaturated hydrocarbons, and then a saturation and polymerization of said products.

5. A process for manufacturing liquid fuels which consists in vaporizing hydrocarbons and subjecting said vapors to a staged catalysis in a series of catalyzers, effecting in successive catalyzers a general hydrogenation, a splitting up of the hydrogenated products into unsaturated hydrocarbons, and a saturation and polymerization of said unsaturated hydrocarbons, the temperature being maintained sufficiently high to avoid condensation of the heavier fractions.

6. A process for manufacturing liquid fuels which consists in vaporizing hydrocarbon products and treating the products of evaporation in a series of catalyzers charged successively with nickel, with vanadium and nickel, and with nickel and cobalt.

7. A process for manufacturing liquid fuels which consists in vaporizing hydrocarbon products, treating the products of evaporation to the catalytic action of nickel at a temperature between 180° and 200° C., then of nickel and vanadium at a temperature between 200° and 250° C., then of nickel and cobalt at a temperature of approximately 180° C., and condensing the resulting products.

8. A process for manufacturing liquid fuels which comprises distilling hydrocarbon products, passing a current of hydrogen containing gas over said products in course of distillation, and treating the combined gas and distillation products in a series of catalyzers effecting in successive catalyzers a hydrogenation of the combined products, a splitting up into unsaturated hydrocarbons, and a saturation and polymerization of said products.

9. A process for manufacturing liquid fuels which comprises distilling hydrocarbon products, passing a current of hydrogen containing gas through the residuum of a previous distillation and then through the products in course of distillation, purifying the combined gas and distillation products, subjecting said combined products to a staged catalysis effecting in successive catalyzers a hydrogenation of the combined products, a splitting up into unsaturated hydrocarbons, and a saturation and polymerization of said products, and condensing the hydrogenated products.

10. A process for manufacturing liquid fuels which consists in distilling hydrocarbon products, passing a hydrocarbon containing gas through the residuum of a previous distillation and then over said products in course of distillation, and treating the combined gas and distillation products in a series of successive catalyzers effecting a hydrogenation of the combined products, a splitting up into unsaturated hydrocarbons, and a saturation and polymerization of said products while maintaining a temperature throughout sufficiently high to prevent condensation of the heavy fractions.

11. In a process for manufacturing liquid fuels which consists in subjecting hydrocarbons to staged catalysis in a series of successive catalyzers, the steps of saturating a hydrocarbon of low molecular weight, changing said saturated hydrocarbon into an unsaturated hydrocarbon of higher molecular weight, and saturating said last named hydrocarbon in successive catalyzers.

12. A process for manufacturing liquid fuels which consists in vaporizing hydrocarbon products, conducting said vaporized products through a purifying element to a series of catalyzers, and effecting in successive catalyzers a general hydrogenation, a splitting up of the hydrocarbon products into unsaturated hydrocarbons, and a saturation and polymerization of said unsaturated hydrocarbons, the temperature of the vaporized products during their passage from the vaporizing apparatus to the catalyzers through the purifying element being maintained sufficiently high to prevent condensation of the heavier fractions.

In testimony whereof I affix my signature.

EUGÈNE ALBERT PRUDHOMME.